(12) United States Patent
Meng et al.

(10) Patent No.: US 12,744,457 B2
(45) Date of Patent: Sep. 22, 2026

(54) POWER CONVERTER AND METHOD OF CONTROLLING THE SAME

(71) Applicant: CHICONY POWER TECHNOLOGY CO., LTD., New Taipei City (TW)

(72) Inventors: Hsiang-Chueh Meng, New Taipei City (TW); Chu-Yen Wu, New Taipei City (TW)

(73) Assignee: CHICONY POWER TECHNOLOGY CO., LTD., New Taipei City (TW)

( * ) Notice: Subject to any disclaimer, the term of this patent is extended or adjusted under 35 U.S.C. 154(b) by 282 days.

(21) Appl. No.: 18/492,218

(22) Filed: Oct. 23, 2023

(65) Prior Publication Data

US 2025/0038677 A1 Jan. 30, 2025

(30) Foreign Application Priority Data

Jul. 24, 2023 (TW) ................................ 112127549

(51) Int. Cl.
*H02M 1/36* (2007.01)
*H02M 1/32* (2007.01)
(Continued)

(52) U.S. Cl.
CPC ............ *H02M 3/01* (2021.05); *H02M 1/322* (2021.05); *H02M 1/36* (2013.01); (Continued)

(58) Field of Classification Search
CPC .... H02M 1/0058; H02M 1/322; H02M 1/344; H02M 1/36; H02M 3/01; H02M 3/33571; H02M 7/53871
See application file for complete search history.

(56) References Cited

U.S. PATENT DOCUMENTS 5,434,767 A * 7/1995 Batarseh ............ H02M 1/4208 363/16
6,256,214 B1 7/2001 Farrington et al.
(Continued)

FOREIGN PATENT DOCUMENTS

CN 203691272 U 7/2014
CN 204205994 U 3/2015
(Continued)

OTHER PUBLICATIONS

Office Action dated Jun. 21, 2024 of the corresponding Taiwan patent application No. 112127549.

*Primary Examiner* — Gary L Laxton
(74) *Attorney, Agent, or Firm* — MUNCY, GEISSLER, OLDS & LOWE, P.C.

(57) ABSTRACT

A power converter includes a transformer, an inductance-capacitance resonance circuit, a first switch, a second switch, and a controller. The transformer includes a primary-side winding and a secondary-side winding. The inductance-capacitance resonance circuit is coupled to the primary-side winding, and the inductance-capacitance resonance circuit includes a resonance capacitor and a resonance inductor. The first switch and the second switch are coupled to the inductance-capacitance resonance circuit. The controller receives an output voltage feedback signal of the power converter and complementarily controls the first switch and the second switch to be turned on and turned off according to the output voltage feedback signal so as to adjust an output voltage of the power converter.

12 Claims, 15 Drawing Sheets

(51) Int. Cl.

| | |
|---|---|
| ***H02M 3/00*** | (2006.01) |
| ***H02M 3/335*** | (2006.01) |
| ***H02M 7/5387*** | (2007.01) |
| *H02M 1/00* | (2006.01) |
| *H02M 1/34* | (2007.01) |

(52) U.S. Cl.

CPC ... *H02M 3/33571* (2021.05); *H02M 7/53871* (2013.01); *H02M 1/0058* (2021.05); *H02M 1/344* (2021.05)

(56) References Cited

U.S. PATENT DOCUMENTS

| | | | | |
|---|---|---|---|---|
| 6,353,547 | B1 | 3/2002 | Jang et al. | |
| 6,396,716 | B1 * | 5/2002 | Liu | H02M 3/33571 363/17 |
| 6,421,262 | B1 | 7/2002 | Saxelby et al. | |
| 11,228,250 | B2 | 1/2022 | Chou | |
| 2013/0194831 | A1 * | 8/2013 | Hu | H02M 3/33507 363/21.01 |
| 2024/0120831 | A1 * | 4/2024 | Jiang | H02M 3/33592 |
| 2024/0120849 | A1 * | 4/2024 | Jiang | H02M 1/344 |

FOREIGN PATENT DOCUMENTS

| | | | |
|---|---|---|---|
| CN | 204858973 | U | 12/2015 |
| CN | 106469983 | A | 3/2017 |
| CN | 114793069 | A | 7/2022 |
| CN | 115036896 | A | 9/2022 |
| CN | 115549457 | A | 12/2022 |
| TW | M299410 | U | 10/2006 |
| TW | 201210184 | A | 3/2012 |
| TW | 201735518 | A | 10/2017 |

* cited by examiner

POWER CONVERTER AND METHOD OF CONTROLLING THE SAME

BACKGROUND

Technical Field

The present disclosure relates to a power converter and a method of controlling the same, and more particularly to an asymmetric half-bridge flyback converter and a method of controlling the same.

Description of Related Art

The statements in this section merely provide background information related to the present disclosure and do not necessarily constitute prior art.

The so-called half-bridge DC converter is a power conversion structure that converts DC voltage into different DC voltages. It is mainly composed of two switch transistors, that is, the switch components are alternately repeatedly turned-on and turned-off so as to achieve the purpose of adjusting the output voltage. Moreover, an asymmetric half-bridge converter (AHB converter) has the characteristics of fewer components, switch voltage clamping soft switching, and is therefore widely used in the field of low and medium power conversion. The half-bridge converter is controlled by means of pulse width modulation (PWM) with asymmetric duty cycle so as to realize the soft switching of the switches of the half-bridge converter.

The asymmetric half-bridge flyback converter (AHB flyback converter) combines the advantages of the primary-side zero-voltage switching of the LLC resonance circuit structure and the wide voltage output of the flyback circuit structure, which is suitable for high switching frequency power conversion applications. However, with this converter circuit structure, the resonance capacitor of the LLC resonance circuit will retain/accumulate energy after an alternating current (AC) power source stops supplying power. Therefore, if the AC power source re-supplies power again, a switch of the converter, which is grounded, is turned on, which will make the residual/accumulated energy on the resonance capacitor conduct to the ground instantaneously, resulting in a surge current. This surge current will cause the risk of damage to switches, and the stress level of the switches must be increased, which will increase the cost of the circuit.

Therefore, how to design a power converter and a method of controlling the same to solve the problems and technical bottlenecks in the existing technology has become a critical topic in this field.

SUMMARY

An objective of the present disclosure is to provide a power converter, and the power converter includes a transformer, an inductance-capacitance resonance circuit, a first switch and a second switch coupled to the first switch, and a controller. The transformer includes a primary-side winding and a secondary-side winding coupled to the primary-side winding. The inductance-capacitance resonance circuit is coupled to the primary-side winding, and the inductance-capacitance resonance circuit includes a resonance capacitor and a resonance inductor. The resonance inductor is a magnetizing inductance of the primary-side winding. The first switch and the second switch are coupled to the inductance-capacitance resonance circuit. The controller receives an output voltage feedback signal of the power converter and complementarily controls the first switch and the second switch to be turned on and turned off according to the output voltage feedback signal so as to adjust an output voltage of the power converter.

In one embodiment, the power converter further includes a discharging circuit. The discharging circuit is connected to the resonance capacitor in parallel.

In one embodiment, the discharging circuit includes a resistor and a switch. The switch is connected to the resistor in series.

In one embodiment, the first switch is connected to the inductance-capacitance resonance circuit in parallel.

In one embodiment, the second switch is connected to the inductance-capacitance resonance circuit in parallel.

In one embodiment, the controller provides a first control signal to control the first switch, provides a second control signal to control the second switch, and provides a discharging control signal to control the switch.

In one embodiment, based on the power converter supplied power by an input power source, when the first switch is turned off, the second switch is turned on, and the switch is turned off, the resonance inductor stores energy; when the first switch is turned on, the second switch is turned off, and the switch is turned off, the resonance inductor and the resonance capacitor execute a resonance operation so as to transfer the energy stored in the resonance inductor to the secondary-side winding.

In one embodiment, based on the power converter not supplied power by the input power source, when the switch is turned on, the energy accumulated in the resonance capacitor is released through a discharging path provided by the resistor and the switch.

In one embodiment, based on the power converter re-supplied power by the input power source, when the first switch is turned off, the second switch is turned on, and the switch is turned off, a voltage across two ends of the capacitance capacitor is zero so as to activate the power converter.

In one embodiment, based on the power converter supplied power by an input power source, when the first switch is turned on, the second switch is turned off, and the switch is turned off, the resonance inductor stores energy; when the first switch is turned off, the second switch is turned on, and the switch is turned off, the resonance inductor and the resonance capacitor execute a resonance operation so as to transfer the energy stored in the resonance inductor to the secondary-side winding.

In one embodiment, based on the power converter not supplied power by the input power source, when the switch is turned on, the energy accumulated in the resonance capacitor is released through a discharging path provided by the resistor and the switch.

In one embodiment, based on the power converter re-supplied power by the input power source, when the first switch is turned on, the second switch is turned off, and the switch is turned off, a voltage across two ends of the capacitance capacitor is zero so as to activate the power converter.

Therefore, the power converter of the present disclosure has the following features and advantages: the discharging circuit, i.e., an energy-releasing circuit, is connected to the resonance capacitor in parallel, and after the AC power source stops supplying power, the switch is turned on so as to release/discharge the energy accumulated in the resonance capacitor by the resistor. When the AC power source re-supplies power to the power converter, the power converter is switched to be activated under the zero-voltage condition of the resonance capacitor (i.e., no voltage difference between two ends of the resonance capacitor), thereby protecting the switch components.

Another objective of the present disclosure is to provide a method of controlling a power converter. The power converter includes an inductance-capacitance resonance circuit having a resonance capacitor and a resonance inductor, a first switch and a second switch coupled to the inductance-capacitance resonance circuit, and a discharging circuit having a resistor and a switch and connected to the resonance capacitor in parallel. The method of controlling the power converter includes steps of: supplying power to the power converter by an input power source; storing energy by the resonance inductor when the first switch is turned off, the second switch is turned on, and the switch is turned off; executing a resonance operation by the resonance inductor and the resonance capacitor when the first switch is turned on, the second switch is turned off, and the switch is turned off so as to transfer the energy stored in the resonance inductor to the secondary-side winding.

In one embodiment, the method further includes steps of: stopping supplying power to the power converter by the input power source; releasing the energy accumulated in the resonance capacitor through a discharging path provided by the resistor and the switch when the switch is turned on.

In one embodiment, the method further includes steps of: re-supplying power to the power converter by the input power source; activating the power converter under a zero-voltage condition of the resonance capacitor when the first switch is turned off, the second switch is turned on, and the switch is turned off.

Therefore, the method of controlling the power converter of the present disclosure has the following features and advantages: the discharging circuit, i.e., an energy-releasing circuit, is connected to the resonance capacitor in parallel, and after the AC power source stops supplying power, the switch is turned on so as to release/discharge the energy accumulated in the resonance capacitor by the resistor. When the AC power source re-supplies power to the power converter, the power converter is switched to be activated under the zero-voltage condition of the resonance capacitor (i.e., no voltage difference between two ends of the resonance capacitor), thereby protecting the switch components.

It is to be understood that both the foregoing general description and the following detailed description are exemplary, and are intended to provide further explanation of the present disclosure as claimed. Other advantages and features of the present disclosure will be apparent from the following description, drawings, and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1:
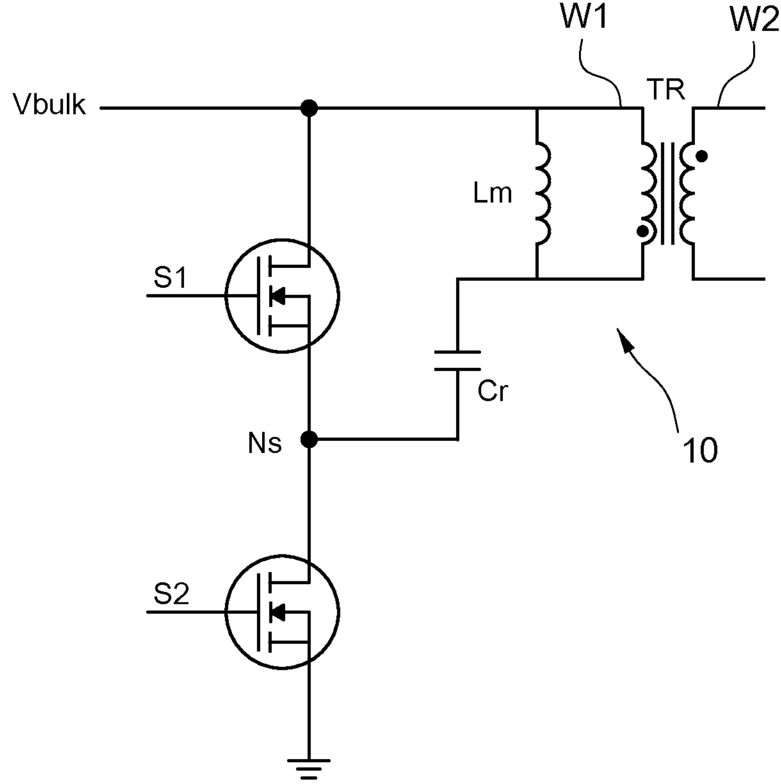
FIG. 1 is a circuit diagram of a power converter according to a first embodiment of the present disclosure.

Reference will now be made to the drawing figures to describe the present disclosure in detail. It will be understood that the drawing figures and exemplified embodiments of present disclosure are not limited to the details thereof.

Figure 2:
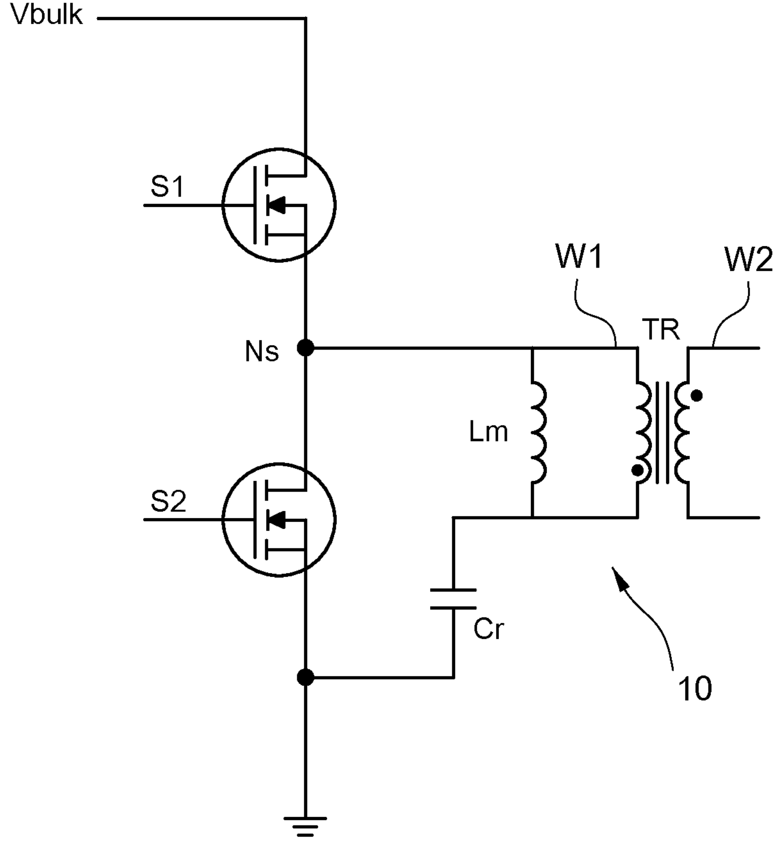
FIG. 2 is a circuit diagram of a power converter according to a second embodiment of the present disclosure.

Please refer to FIG. 1 and FIG. 2, which show respectively circuit diagrams of a power converter according to a first embodiment and a second embodiment of the present disclosure. The power converter includes a transformer TR, an inductance-capacitance resonance circuit 10, a first switch S1, a second switch S2, and a controller 20. The transformer TR includes a primary-side winding W1 and a secondary-side winding W2 coupled to the primary-side winding W1.

The inductance-capacitance resonance circuit 10, i.e., an LC resonance circuit, is coupled to the primary-side winding W1. The inductance-capacitance resonance circuit 10 includes a resonance capacitor Cr and a resonance inductor, wherein the resonance inductor is a magnetizing inductance Lm of the primary-side winding W1, that is, the magnetizing inductance Lm and the resonance capacitor Cr respectively provide the inductance (L) part and the capacitor (C) part of the inductance-capacitance resonance circuit 10. Moreover, the inductance-capacitance resonance circuit 10 coupled to the primary-side winding W1 receives a DC voltage (i.e., a bulk voltage) Vbulk.

The first switch S1 and the second switch S2 are coupled to the inductance-capacitance resonance circuit 10. As the first embodiment shown in FIG. 1, the first switch S1 and the second switch S2 are commonly connected at a node Ns. One end of the first switch S1, which is not a control end, for example but limited to a drain of an n-type MOS switch, is coupled to the magnetizing inductance Lm of the inductance-capacitance resonance circuit 10 and the DC voltage Vbulk. The other end of the first switch S1, which is not the control end, for example but limited to a source of the n-type MOS switch, is coupled to the resonance capacitor Cr of the inductance-capacitance resonance circuit 10 and the node Ns. One end of the second switch S2, which is not a control end, for example but limited to a drain of an n-type MOS switch, is coupled to the resonance capacitor Cr of the inductance-capacitance resonance circuit 10 and the node Ns. The other end of the second switch S2, which is not the control end, for example but limited to a source of the n-type MOS switch, is grounded. Therefore, in the first embodiment, the first switch S1 is connected to the inductance-capacitance resonance circuit 10 in parallel. In this embodiment, the control end is a gate of the n-type MOS switch.

As the second embodiment shown in FIG. 2, the first switch S1 and the second switch S2 are commonly connected at a node Ns. One end of the first switch S1, which is not a control end, for example but limited to a drain of an n-type MOS switch, is coupled to the DC voltage Vbulk. The other end of the first switch S1, which is not the control end, for example but limited to a source of the n-type MOS switch, is coupled to the magnetizing inductance Lm of the inductance-capacitance resonance circuit 10 and the node Ns. One end of the second switch S2, which is not a control end, for example but limited to a drain of an n-type MOS switch, is coupled to the magnetizing inductance Lm of the inductance-capacitance resonance circuit 10 and the node Ns. The other end of the second switch S2, which is not the control end, for example but limited to a source of the n-type MOS switch, is coupled to the resonance capacitor Cr of the inductance-capacitance resonance circuit 10 and is grounded. Therefore, in the first embodiment, the second switch S2 is connected to the inductance-capacitance resonance circuit 10 in parallel. In this embodiment, the control end is a gate of the n-type MOS switch.

The controller 20 receives an output voltage feedback signal $S_{VOUT}$ of the power converter (refer to FIG. 5 and FIG. 6 first, and describe in detail later) and complementarily controls the first switch S1 and the second switch S2 to be turned on and turned off according to the output voltage feedback signal $S_{VOUT}$ so as to adjust an output voltage of the power converter. In particular, the output voltage feedback signal $S_{VOUT}$ is a signal that is positively correlated with the output voltage of the power converter, such as a voltage signal. In other words, a voltage value of the output voltage feedback signal $S_{VOUT}$ may reflect a voltage magnitude of the output voltage of the power converter. Therefore, the controller 20 controls the first switch S1 and the second switch S2 to be turned on and turned off according to the voltage value of the output voltage feedback signal $S_{VOUT}$ (i.e., the voltage magnitude of the output voltage). Therefore, the turned-on time and turned-off time of the switch S1 and the second switch S1 are adjusted to adjust the energy stored on the primary side of the power converter and the energy transferred to the secondary side, thereby adjusting the voltage magnitude of the output voltage of the power converter.

Figure 3:
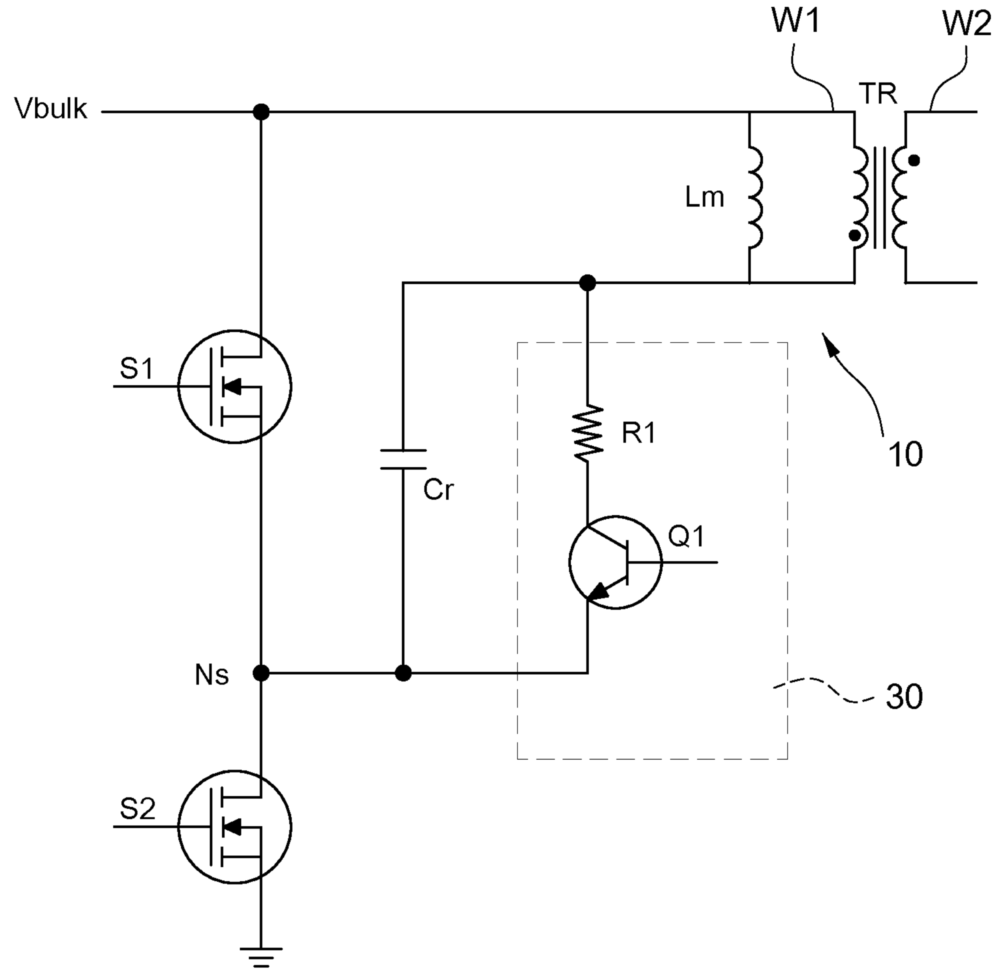
FIG. 3 is a circuit diagram of a power converter according to a third embodiment of the present disclosure.
Figure 4:
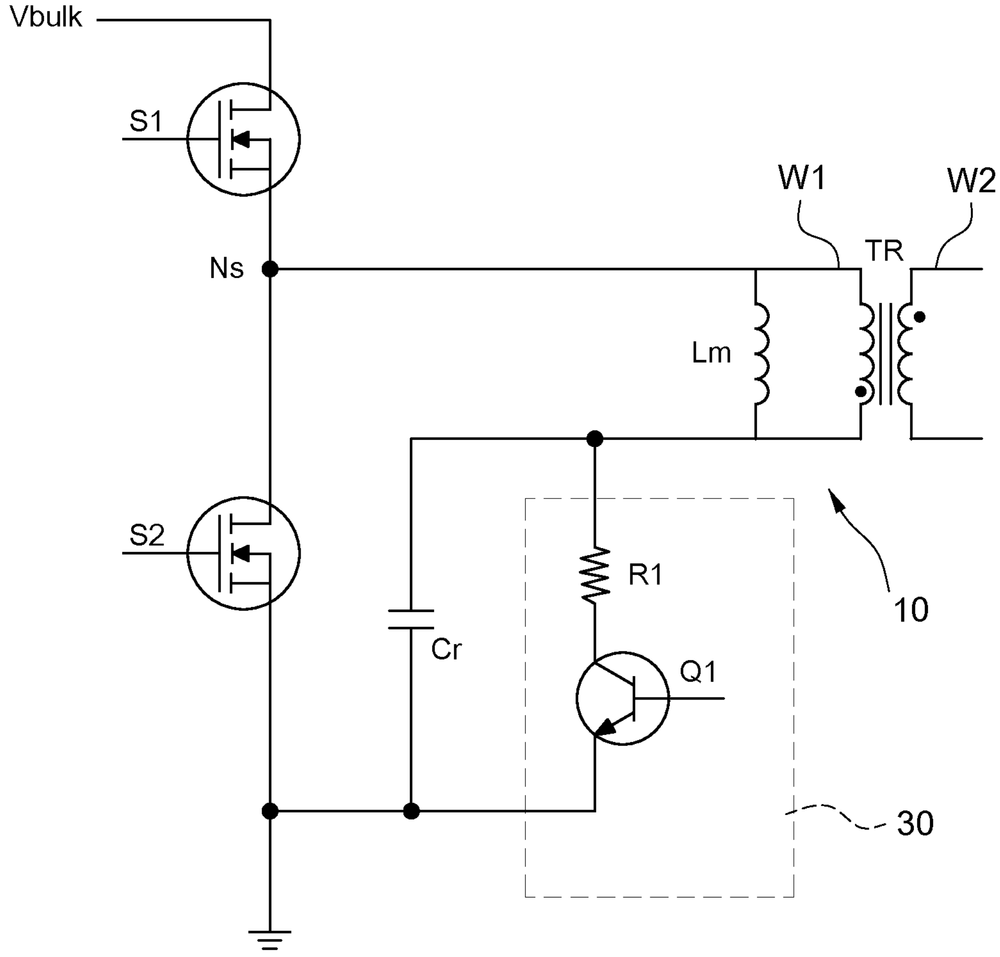
FIG. 4 is a circuit diagram of a power converter according to a fourth embodiment of the present disclosure.

Please refer to FIG. 3 and FIG. 4, which show respectively circuit diagrams of a power converter according to a third embodiment and a fourth embodiment of the present disclosure. Compared with the first embodiment shown in FIG. 1 and the second embodiment shown in FIG. 2, the power converter shown in FIG. 3 and FIG. 4 further includes a discharging circuit 30. The discharging circuit 30 is connected to the resonance capacitor Cr in parallel. Specifically, the resonance capacitor Cr includes a resistor R1 and a switch Q1. The switch Q1 is connected to the resistor R1 in series to form a series-connected branch. In the third embodiment shown in FIG. 3, two ends of the series-connected branch are respectively connected to two ends of the resonance capacitor Cr, and one end of the series-connected branch is connected to the magnetizing inductance Lm and the other end of the series-connected branch is connected to the node Ns. In the fourth embodiment shown in FIG. 4, two ends of the series-connected branch are respectively connected to two ends of the resonance capacitor Cr, and one end of the series-connected branch is connected to the magnetizing inductance Lm and the other end of the series-connected branch is grounded. Incidentally, the discharging circuit used in the present disclosure is not limited by the components and structure shown in the figures. For example, any circuit structure that can provide a discharging path of releasing or discharging energy and the circuit components used should embraced within the scope of the present disclosure.

Figure 5:
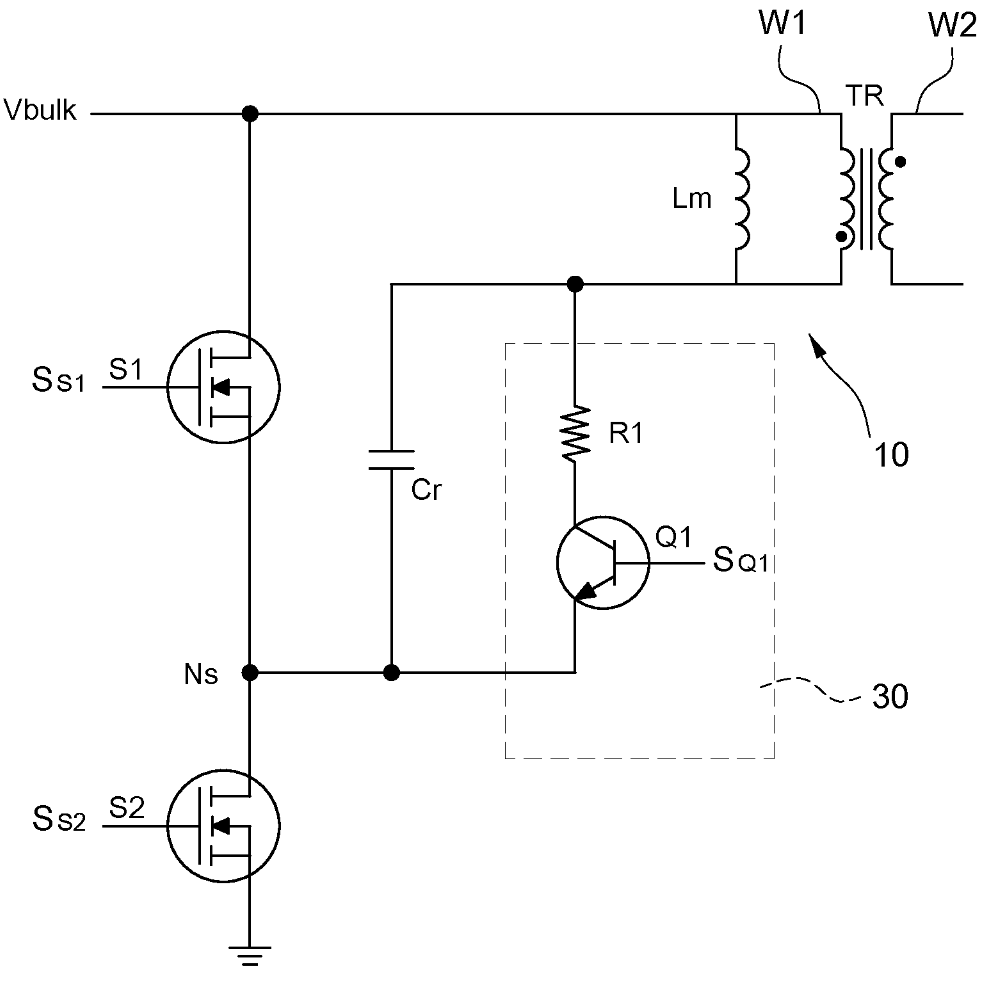
FIG. 5 is a block circuit diagram of the switch control according to the third embodiment of the present disclosure.
Figure 5:
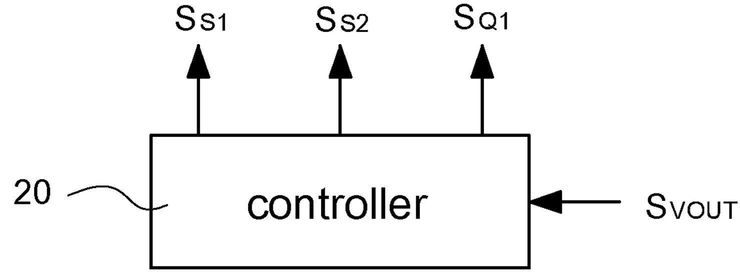
Figure 6:
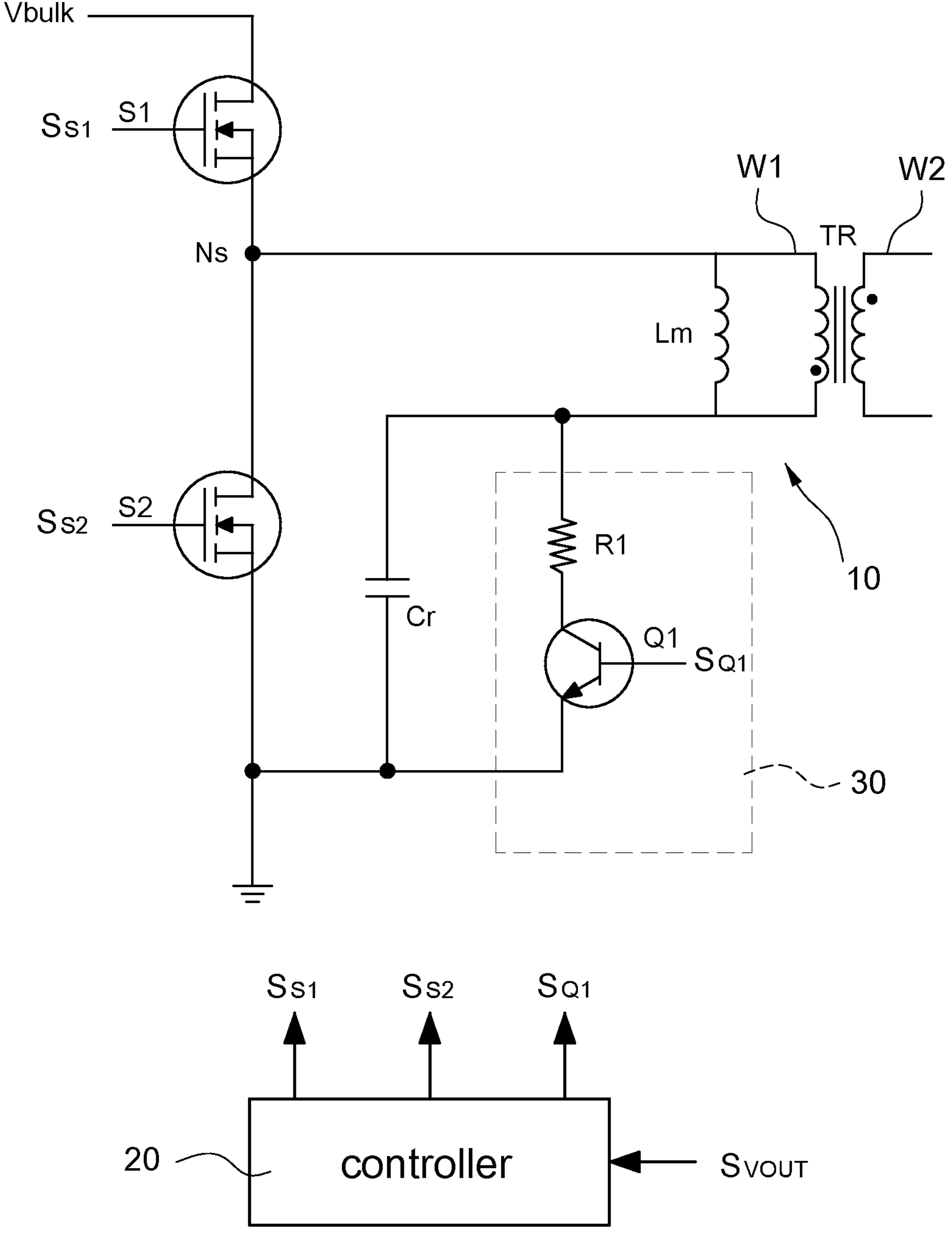
FIG. 6 is a block circuit diagram of the switch control according to the fourth embodiment of the present disclosure.

Please refer to FIG. 5 and FIG. 6, which show respectively block circuit diagrams of the switch control according to the third embodiment and the fourth embodiment of the present disclosure. The controller 20 provides a first control signal $S_{S1}$ to control the first switch S1 to be tuned on and turned off, provides a second control signal $S_{S2}$ to control the second switch S2 to be turned on and turned off, and provides a discharging control signal $S_{Q1}$ to control the switch Q1 to be turned on and turned off.

Figure 7A:
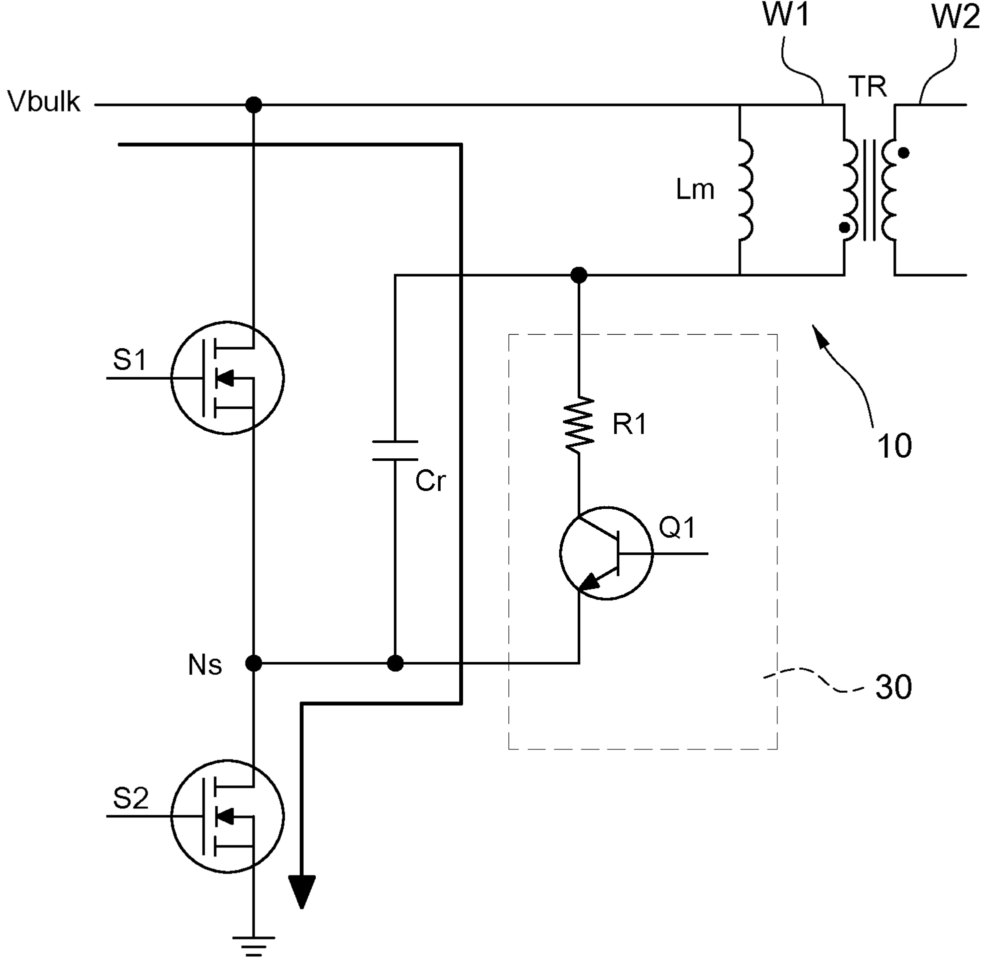
FIG. 7A to FIG. 7D are block circuit diagrams with current paths according to the third embodiment of the present disclosure.

Please refer to FIG. 7A to FIG. 7D, which show block circuit diagrams with current paths according to the third embodiment of the present disclosure. As shown in FIG. 7A, the first control signal $S_{S1}$ turns off the first switch S1, the second control signal $S_{S2}$ turns on the second switch S2, and the discharging control signal $S_{Q1}$ turns off the switch Q1. In this condition, the resonance inductor (i.e., the magnetizing inductance Lm) of the inductance-capacitance resonance circuit 10 stores energy. As shown in FIG. 7A, in the energy-storing operation, a current flows from the DC voltage Vbulk to the magnetizing inductance Lm, the resonance capacitor Cr, the second switch S2, and the ground. Therefore, the magnetizing inductance Lm stores energy from an input power source (presented by the DC voltage Vbulk).

Figure 7B:
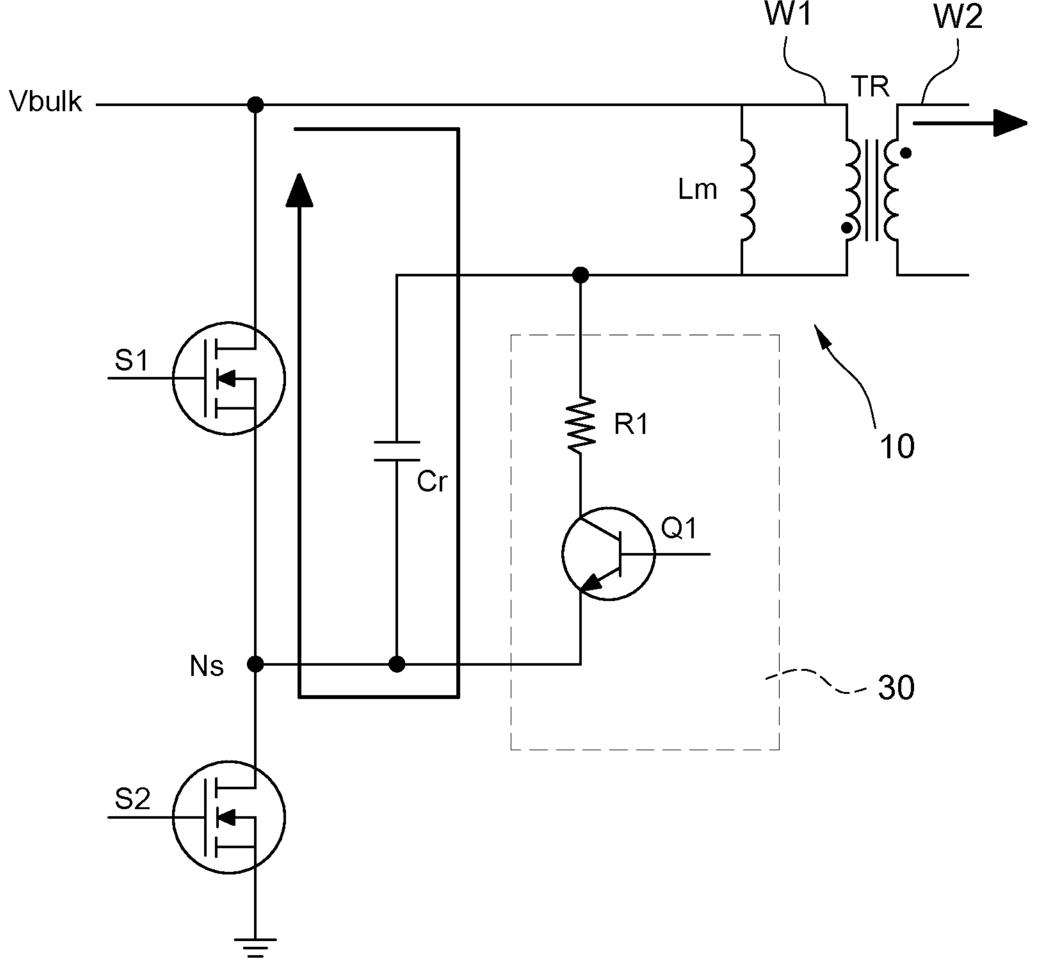

As shown in FIG. 7B, the first control signal $S_{S1}$ turns on the first switch S1, the second control signal $S_{S2}$ turns off the second switch S2, and the discharging control signal $S_{Q1}$ turns off the switch Q1. In this condition, the resonance inductor (i.e., the magnetizing inductance Lm) and the resonance capacitor execute a resonance operation so as to transfer the energy stored in the resonance inductor to the secondary-side winding W2 and supply the power required by a load on an output side of the power converter.

Figure 7C:
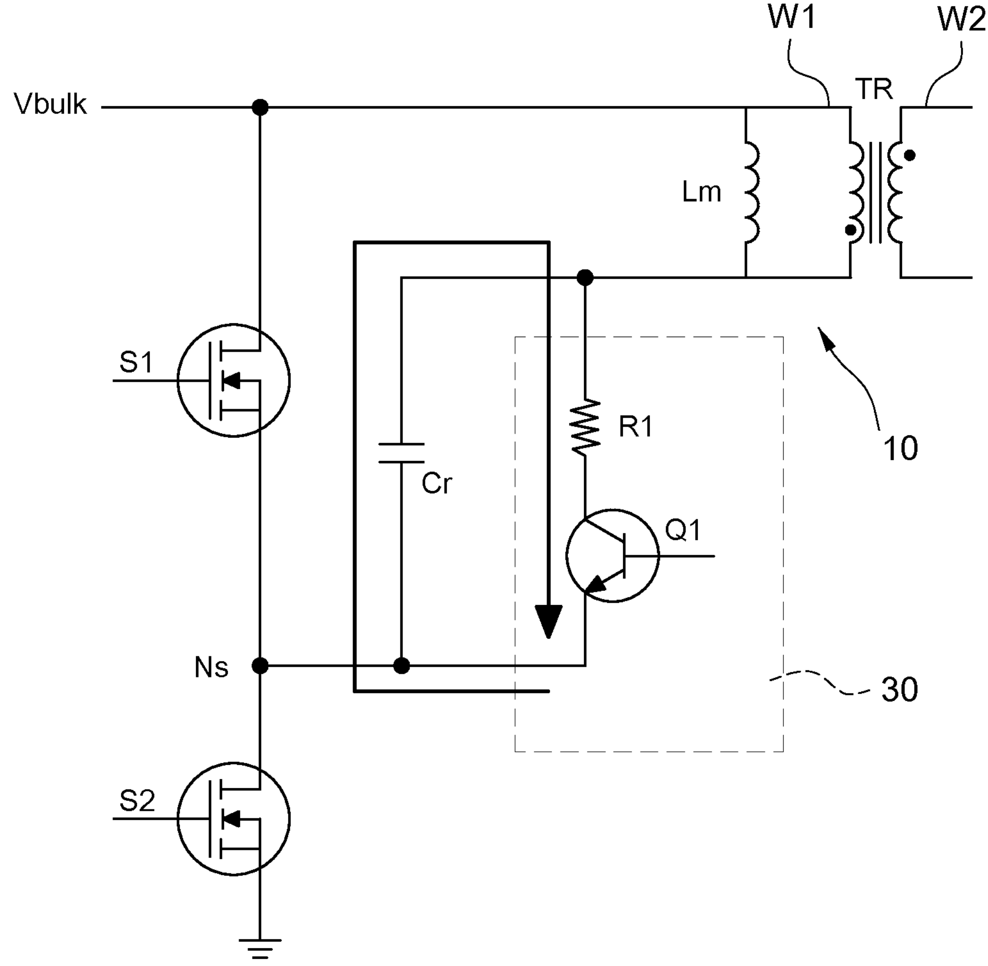

As mentioned above, with this converter structure, there is energy accumulated in the resonance capacitor of the resonance circuit after an alternating-current (AC) power source, i.e., the input power source stops supplying power. Therefore, when the AC power source re-supplies power to the power converter, a switch of the converter, which is grounded, is turned on, which will make the residual/accumulated energy on the resonance capacitor conduct to the ground instantaneously, resulting in a surge current, and this surge current will cause the risk of damage to switches. Corresponding to what is shown in FIG. 7C, when the power converter is not powered/supplied power, the resonance capacitor Cr of the inductance-capacitance resonance circuit 10 will have residual energy. Therefore, when the power converter is not supplied power by the input power source (presented by the DC voltage Vbulk), the first control signal $S_{S1}$ turns off the first switch S1, the second control signal $S_{S2}$ turns off the second switch S2, and the discharging control signal $S_{Q1}$ turns on the switch Q1. In this condition, the energy accumulated in the resonance capacitor Cr is released/discharged through the series-connected branch provided by the resistor R1 and the switch Q1 of the discharging circuit 30.

Figure 7D:
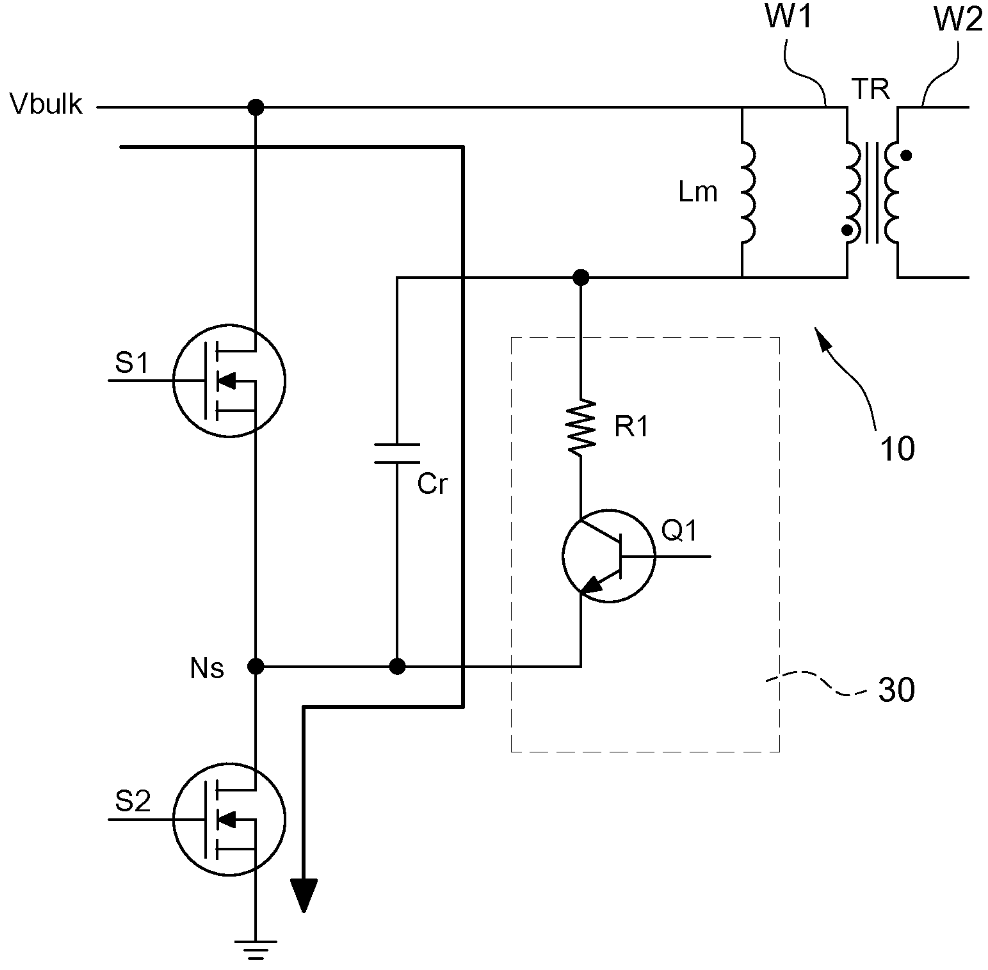

Afterwar, as shown in FIG. 7D, when the input power source (presented by the DC voltage Vbulk) re-supplies power to the power converter, the first control signal $S_{S1}$ turns off the first switch S1, the second control signal $S_{S2}$ turns on the second switch S2, and the discharging control signal $S_{Q1}$ turns off the switch Q1. In this condition, since a voltage across two ends of the resonance capacitor Cr is zero (since the residual energy has been released), the power converter is switched to be activated under the zero-voltage condition of the resonance capacitor Cr, thereby protecting the switch components.

Figure 8A:
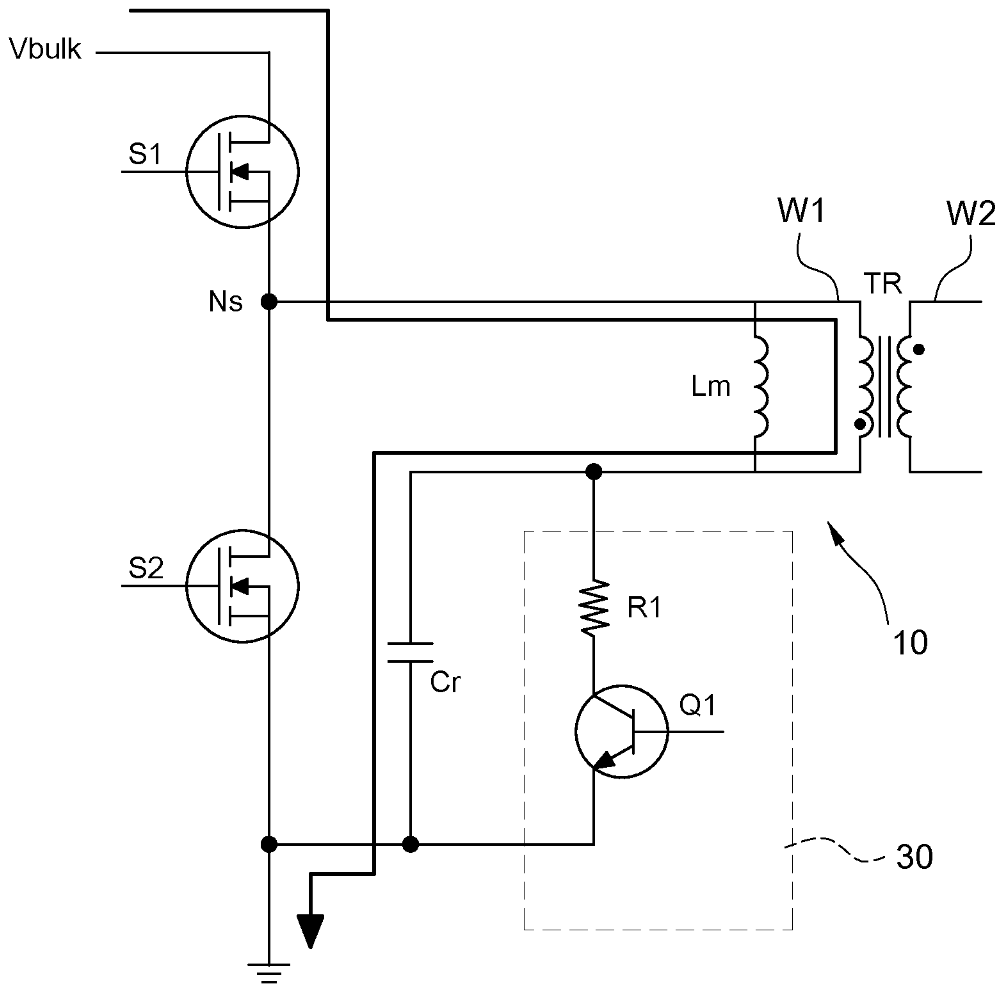
FIG. 8A to FIG. 8D are block circuit diagrams with current paths according to the fourth embodiment of the present disclosure.

Please refer to FIG. 8A to FIG. 8D, which show block circuit diagrams with current paths according to the fourth embodiment of the present disclosure. As shown in FIG. 8A, the first control signal $S_{S1}$ turns on the first switch S1, the second control signal $S_{S2}$ turns off the second switch S2, and the discharging control signal $S_{Q1}$ turns off the switch Q1. In this condition, the resonance inductor (i.e., the magnetizing inductance Lm) of the inductance-capacitance resonance circuit 10 stores energy. As shown in FIG. 8A, in the energy-storing operation, a current flows from the DC voltage Vbulk to the first switch S1, the magnetizing inductance Lm, the resonance capacitor Cr, and the ground. Therefore, the magnetizing inductance Lm stores energy from an input power source (presented by the DC voltage Vbulk).

Figure 8B:
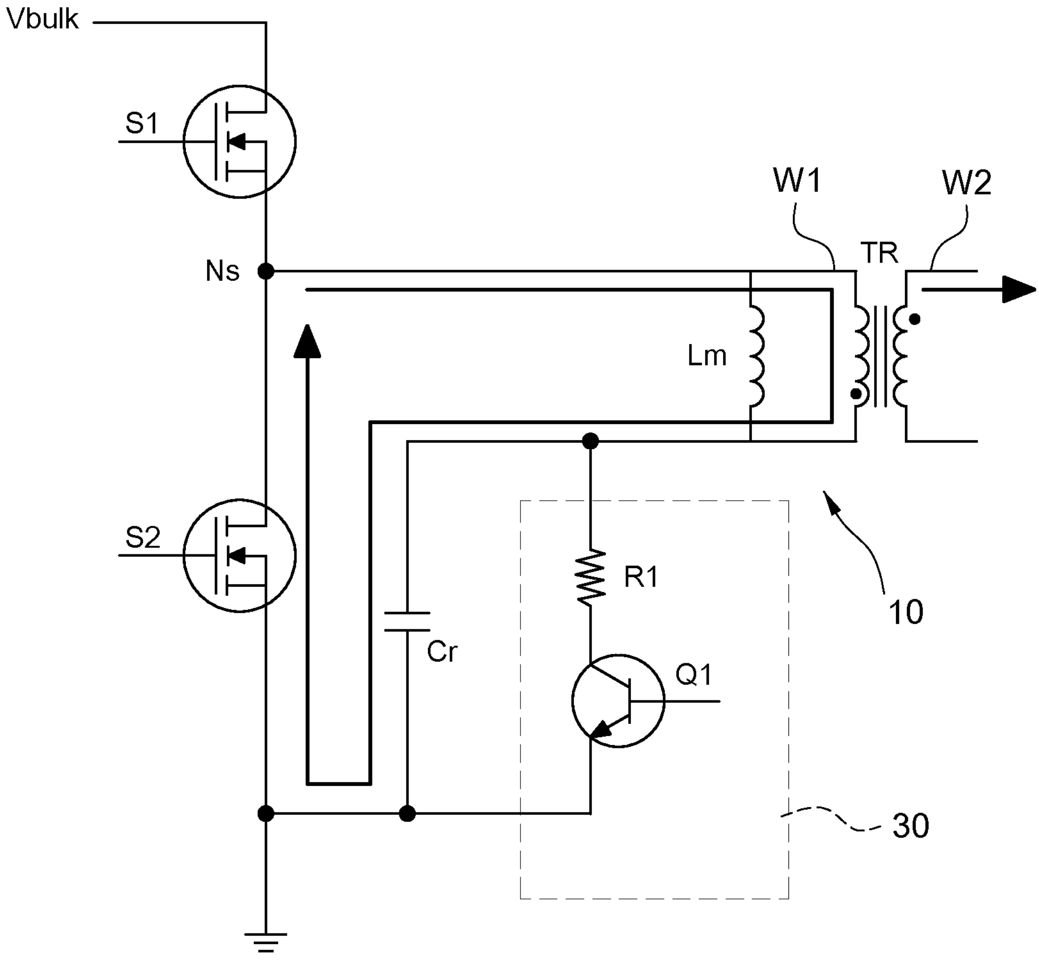

As shown in FIG. 8B, the first control signal $S_{S1}$ turns off the first switch S1, the second control signal $S_{S2}$ turns on the second switch S2, and the discharging control signal $S_{Q1}$ turns off the switch Q1. In this condition, the resonance inductor (i.e., the magnetizing inductance Lm) and the resonance capacitor execute a resonance operation so as to transfer the energy stored in the resonance inductor to the secondary-side winding W2 and supply the power required by a load on an output side of the power converter.

Figure 8C:
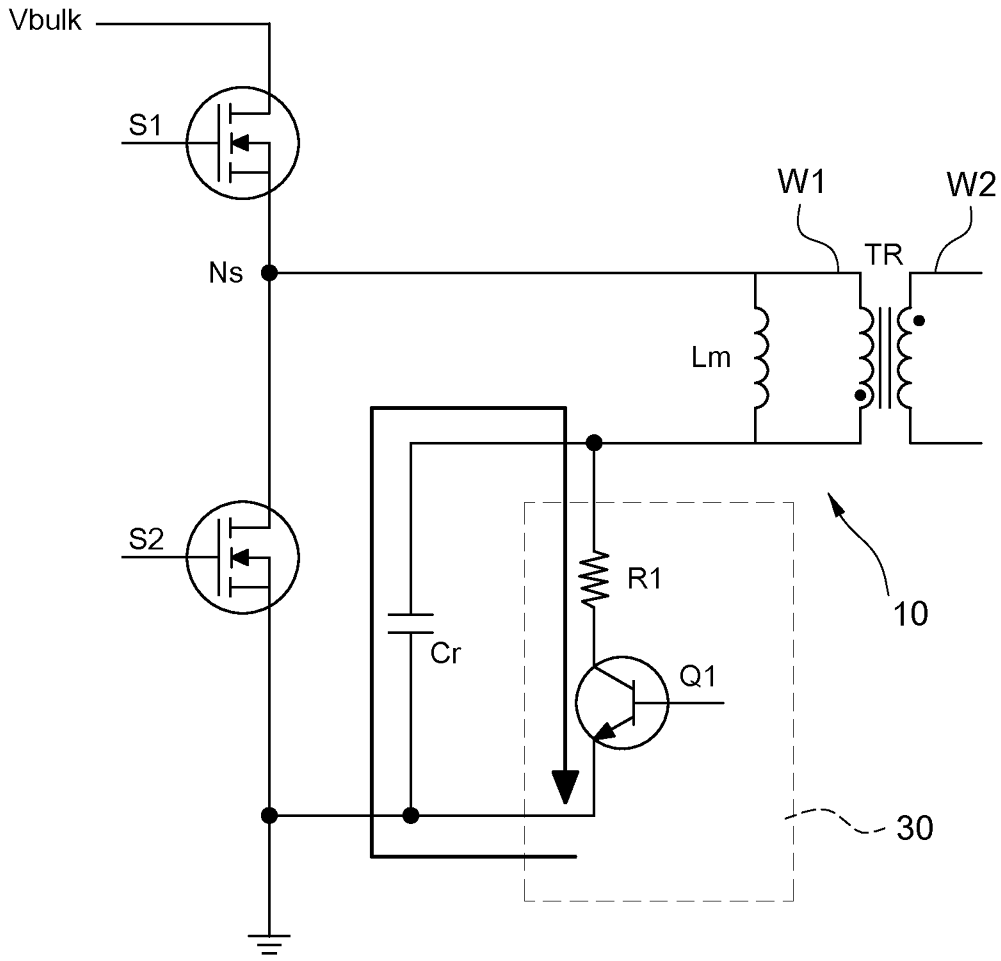

As mentioned above, with this converter structure, there is energy accumulated in the resonance capacitor of the resonance circuit after an alternating-current (AC) power source, i.e., the input power source stops supplying power. Therefore, when the AC power source re-supplies power to the power converter, a switch of the converter, which is grounded, is turned on, which will make the residual/accumulated energy on the resonance capacitor conduct to the ground instantaneously, resulting in a surge current, and this surge current will cause the risk of damage to switches. Corresponding to what is shown in FIG. 8C, when the power converter is not powered/supplied power, the resonance capacitor Cr of the inductance-capacitance resonance circuit 10 will have residual energy. Therefore, when the power converter is not supplied power by the input power source (presented by the DC voltage Vbulk), the first control signal $S_{S1}$ turns off the first switch S1, the second control signal $S_{S2}$ turns off the second switch S2, and the discharging control signal $S_{Q1}$ turns on the switch Q1. In this condition, the energy accumulated in the resonance capacitor Cr is released/discharged through the series-connected branch provided by the resistor R1 and the switch Q1 of the discharging circuit 30.

Figure 8D:
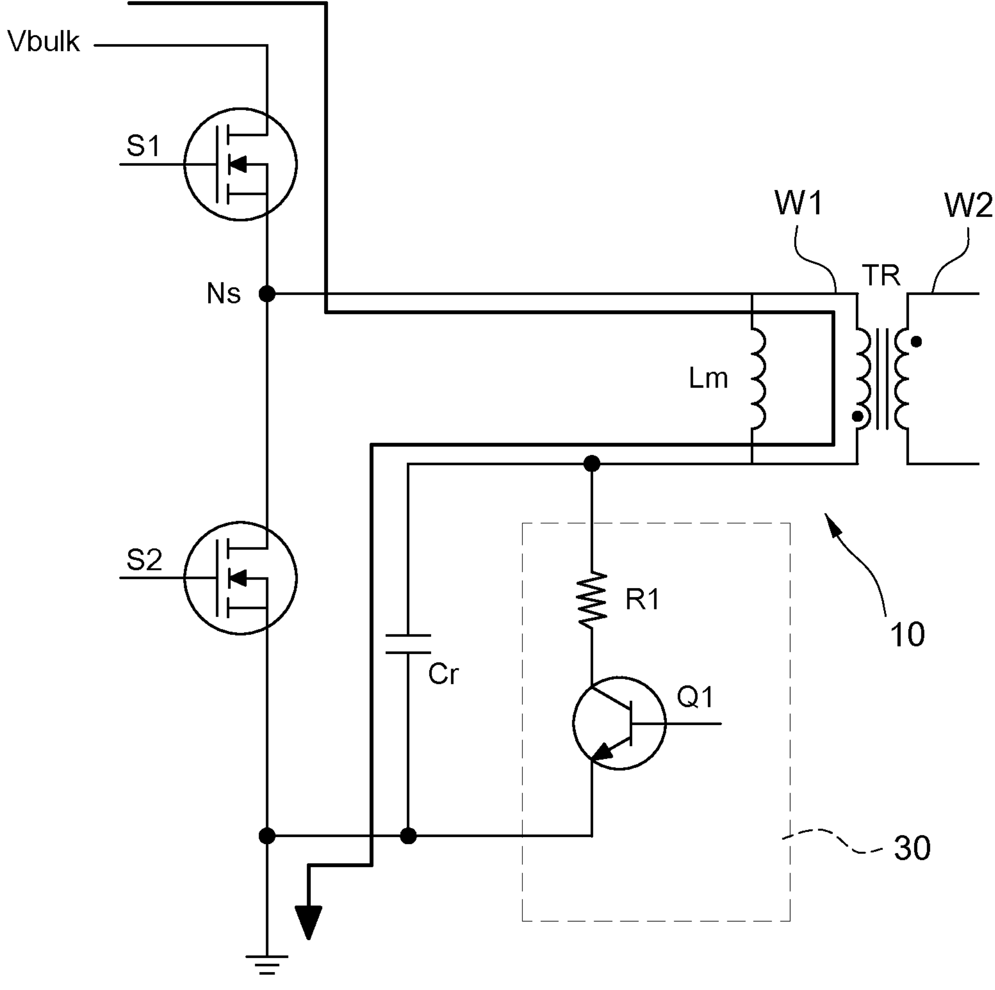

Afterwar, as shown in FIG. 8D, when the input power source (presented by the DC voltage Vbulk) re-supplies power to the power converter, the first control signal $S_{S1}$ turns on the first switch S1, the second control signal $S_{S2}$ turns on the second switch S2, and the discharging control signal $S_{Q1}$ turns off the switch Q1. In this condition, since a voltage across two ends of the resonance capacitor Cr is zero (since the residual energy has been released), the power converter is switched to be activated under the zero-voltage condition of the resonance capacitor Cr, thereby protecting the switch components.

Figure 9:
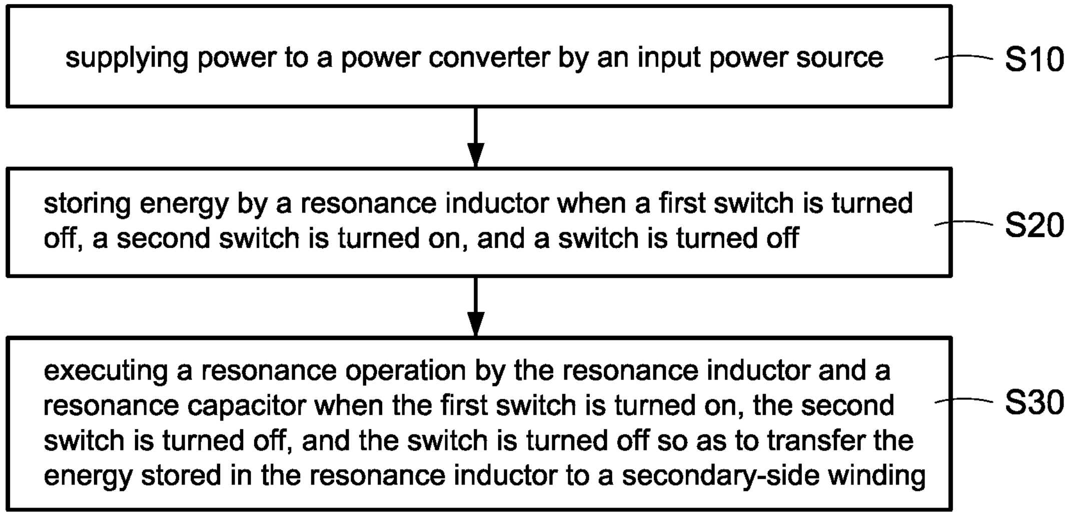
FIG. 9 is a flowchart of a method of controlling the power converter according to the present disclosure.

Please refer to FIG. 9, which shows a flowchart of a method of controlling the power converter according to the present disclosure, and also refer to FIG. 1 to FIG. 8D disclosing circuit structures of the power converter. In the method of controlling the power converter, the power converter includes an inductance-capacitance resonance circuit 10 having a resonance capacitor Cr and a resonance inductor, a first switch S1 and a second switch S2 coupled to the inductance-capacitance resonance circuit 10, and a discharging circuit 30 connected to the resonance capacitor Cr, which having a resistor R1 and a switch Q1. The method of controlling the power converter includes steps of: supplying power to the power converter by an input power source (step S10). Afterward, storing energy by the resonance inductor (step S20) when the first switch S1 is turned off, the second switch S2 is turned on, and the switch is turned off under an input power source (presented by the DC voltage Vbulk) supplying power to the power converter. In particular, the first switch S1 is controlled by a first control signal $S_{S1}$ provided by the controller 20, the second switch S2 is controlled by a second control signal $S_{S2}$ provided by the controller 20, and the switch Q1 is controlled by a discharging control signal $S_{Q1}$ provided by the controller 20. Afterward, executing a resonance operation by the resonance inductor and the resonance capacitor Cr when the first switch S1 is turned on, the second switch S2 is turned off, and the switch Q1 is turned off so as to transfer the energy stored in the resonance inductor to the secondary-side winding (step S30). The detailed description of specific embodiments may be referred to FIG. 7A, FIG. 7B, FIG. 8A, FIG. 8B.

After the step S30, when the power converter is not powered/supplied power, i.e., after the AC power source, i.e., the input power source stops supplying power, the resonance capacitor of the inductance-capacitance resonance circuit will have residual energy. Therefore, when the AC power source re-supplies power to the power converter, a switch of the converter, which is grounded, is turned on, which will make the residual/accumulated energy on the resonance capacitor conduct to the ground instantaneously, resulting in a surge current, and this surge current will cause the risk of damage to switches. When the power converter is not powered/supplied power, the resonance capacitor Cr of the inductance-capacitance resonance circuit 10 will have residual energy. Therefore, when the power converter is not supplied power by the input power source (presented by the DC voltage Vbulk), the discharging control signal $S_{Q1}$ provided by the controller 20 turns on the switch Q1. In this condition, the energy accumulated in the resonance capacitor Cr is released/discharged through the series-connected branch provided by the resistor R1 and the switch Q1 of the discharging circuit 30.

After the energy accumulated in the resonance capacitor Cr is released, based on the power converter is re-supplied power by the input power source, that is, when the input power source (presented by the DC voltage Vbulk) re-supplies power to the power converter, the discharging control signal $S_{Q1}$ provided by the controller 20 turns off the switch Q1. In this condition, since a voltage across two ends of the resonance capacitor Cr is zero (since the residual energy has been released), the power converter is switched to be activated under the zero-voltage condition of the resonance capacitor Cr, thereby protecting the switch components.

In summary, the present disclosure has the following features and advantages: the discharging circuit 30, i.e., an energy-releasing circuit, is connected to the resonance capacitor Cr in parallel, and after the AC power source stops supplying power, the switch Q1 is turned on so as to release/discharge the energy accumulated in the resonance capacitor Cr by the resistor R1. When the AC power source re-supplies power to the power converter, the power converter is switched to be activated under the zero-voltage condition of the resonance capacitor Cr (i.e., no voltage difference between two ends of the resonance capacitor Cr), thereby protecting the switch components.

Incidentally, in models with multiple output voltages (such as PD models), they are generally designed with the maximum output voltage and maximum output wattage, and therefore when the design of the transformer is fixed, the leakage inductance is also fixed. Therefore, under the condition of the maximum output voltage (wattage), the capacitance value of the resonance capacitor may be calculated and designed according to related formulas. However, once at other output voltages, the capacitance value of the resonance capacitor cannot be the capacitance value required by the output voltage. In this condition, when the capacitance value of the resonance capacitor is insufficient, the efficiency will decrease, the voltage surge of the resonance capacitor will become larger, and the resonance current will become larger, which will cause damage to the transistor switches in the AHB circuit structure.

Since the capacitance value of a single resonance capacitor cannot be compatible with the capacitance values required by all output voltages, a capacitance adjustment circuit is used to change the required capacitance value. After the output voltage is detected (that is, the output voltage is known), the capacitance adjustment circuit may be used to connect in parallel, in series, in parallel-series or in series-parallel with the resonance capacitor, thereby changing the equivalent capacitance value.

Specifically, a first embodiment of the capacitance adjustment circuit is: the capacitance adjustment circuit includes a capacitor and a switch, and the capacitor is connected to the switch in series to form a series-connected branch. In particular, the series-connected branch is connected to the resonance capacitor in parallel. In addition, in this embodiment, the number of series-connected branch may also be plural, and the plural series-connected branches are respectively connected to the resonance capacitor in parallel. Therefore, by controlling the turning-on and turning-off of the plural switches, the capacitance value of the parallel-connected capacitors, which are connected to the resonance capacitor, is adjusted so as to adjust the equivalent capacitance value.

A second embodiment of the capacitance adjustment circuit is: the capacitance adjustment circuit includes a capacitor and a switching switch. In particular, the switching switch is controlled to control whether the capacitor is connected to the resonance capacitor in series so as to adjust the equivalent capacitance value.

A third embodiment of the capacitance adjustment circuit is: the capacitance adjustment circuit includes a first capacitor, a second capacitor, a switch, and a switching switch. In particular, the first capacitor is connected to the switch in series to form a series-connected branch. In particular, the series-connected branch is connected to the resonance capacitor in parallel. In addition, in this embodiment, the number of series-connected branch may also be plural, and the plural series-connected branches are respectively connected to the resonance capacitor in parallel. Therefore, by controlling the switching of the switching switch to control whether the second capacitor is connected to the resonance capacitor in series so as to adjust the equivalent capacitance value.

A fourth embodiment of the capacitance adjustment circuit is: the capacitance adjustment circuit includes a first capacitor, a second capacitor, a switch, and a switching switch. In particular, by controlling the switching of the switching switch to control whether the second capacitor is connected to the resonance capacitor in series. In particular, the first capacitor is connected to the switch in series to form a series-connected branch. In particular, the series-connected branch is connected to the resonance capacitor in parallel or connected to the resonance capacitor and the second capacitor in parallel. In addition, in this embodiment, the number of series-connected branch may also be plural, and the plural series-connected branches are respectively connected to the resonance capacitor in parallel or connected to the resonance capacitor and the second capacitor in parallel so as to adjust the equivalent capacitance value.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A power converter, comprising:

a transformer, comprising a primary-side winding and a secondary-side winding coupled to the primary-side winding, an inductance-capacitance resonance circuit, coupled to the primary-side winding, and the inductance-capacitance resonance circuit comprising a resonance capacitor and a resonance inductor, wherein the resonance inductor is a magnetizing inductance of the primary-side winding, a first switch and a second switch coupled to the first switch, and the first switch and the second switch coupled to the inductance-capacitance resonance circuit, a discharging circuit connected to the resonance capacitor, and the discharging circuit comprising:

a resistor, and a discharging control switch connected to the resistor in series to form a series-connected branch, and a controller, configured to receive an output voltage feedback signal of the power converter and complementarily control the first switch and the second switch to be turned on and turned off according to the output voltage feedback signal so as to adjust an output voltage of the power converter, wherein when the power converter is not supplied power by an input power source in a stop stage, the controller is configured to turn off the first switch and the second switch, and turn on the discharging control switch so that energy accumulated in the resonance capacitor is released through the series-connected branch, and wherein before the power converter enters a re-supplying stage from the stop state, the controller is further configured to turn on a discharging path for a predetermined time period to release energy stored in the resonance capacitor so as to reduce a resonance current during a first cycle of the re-supplying stage.

2. The power converter as claimed in claim 1, wherein the first switch is connected to the inductance-capacitance resonance circuit in parallel.

3. The power converter as claimed in claim 2, wherein based on the power converter supplied power by the input power source, when the first switch is turned off, the second switch is turned on, and the discharging control switch is turned off, the resonance inductor stores energy, when the first switch is turned on, the second switch is turned off, and the discharging control switch is turned off, the resonance inductor and the resonance capacitor execute a resonance operation so as to transfer the energy stored in the resonance inductor to the secondary-side winding.

4. The power converter as claimed in claim 3, wherein based on the power converter not supplied power by the input power source, when the discharging control switch is turned on, the energy accumulated in the resonance capacitor is released through the discharging path provided by the resistor and the discharging control switch.

5. The power converter as claimed in claim 4, wherein based on the power converter re-supplied power by the input power source, when the first switch is turned off, the second switch is turned on, and the discharging control switch is turned off, a voltage across two ends of the capacitance capacitor is zero so as to activate the power converter.

6. The power converter as claimed in claim 2, wherein based on the power converter supplied power by the input power source, when the first switch is turned on, the second switch is turned off, and the discharging control switch is turned off, the resonance inductor stores energy, when the first switch is turned off, the second switch is turned on, and the discharging control switch is turned off, the resonance inductor and the resonance capacitor execute a resonance operation so as to transfer the energy stored in the resonance inductor to the secondary-side winding.

7. The power converter as claimed in claim 6, wherein based on the power converter not supplied power by the input power source, when the discharging control switch is turned on, the energy accumulated in the resonance capacitor is released through the discharging path provided by the resistor and the discharging control switch.

8. The power converter as claimed in claim 7, wherein based on the power converter re-supplied power by the input power source, when the first switch is turned on, the second switch is turned off, and the discharging control switch is turned off, a voltage across two ends of the capacitance capacitor is zero so as to activate the power converter.

9. The power converter as claimed in claim 1, wherein the second switch is connected to the inductance-capacitance resonance circuit in parallel.

10. The power converter as claimed in claim 1, wherein the controller is configured to provide a first control signal to control the first switch, provide a second control signal to control the second switch, and provide a discharging control signal to control the discharging control switch.

11. A method of controlling a power converter, the power converter comprising an inductance-capacitance resonance circuit comprising a resonance capacitor and a resonance inductor, a first switch and a second switch coupled to the inductance-capacitance resonance circuit, and a discharging circuit comprising a resistor and a discharging control switch connected in series to form a series-connected branch, and connected to the resonance capacitor in parallel, the method of controlling the power converter comprising steps of:

supplying power to the power converter by an input power source, storing energy by the resonance inductor when the first switch is turned off, the second switch is turned on, and the discharging control switch is turned off, executing a resonance operation by the resonance inductor and the resonance capacitor when the first switch is turned on, the second switch is turned off, and the discharging control switch is turned off so as to transfer the energy stored in the resonance inductor to the secondary-side winding, and releasing energy accumulated in the resonance capacitor through the series-connected branch when the first switch and the second switch are turned off and the discharging control switch is turned off when the power converter is not supplied power by the input power source in a stop stage, wherein turning on a discharging path for a predetermined time period to release energy stored in the resonance capacitor before the power converter enters a re-supplying stage from the stop state so as to reduce a resonance current during a first cycle of the re-supplying stage.

12. The method of controlling the power converter as claimed in claim 11, further comprising steps of:

re-supplying power to the power converter by the input power source, and activating the power converter under a zero-voltage condition of the resonance capacitor when the first switch is turned off, the second switch is turned on, and the discharging control switch is turned off.

* * * * *